(12) United States Patent
Wang et al.

(10) Patent No.: US 9,420,290 B2
(45) Date of Patent: Aug. 16, 2016

(54) METHOD AND APPARATUS FOR DECODING AND ENCODING VIDEO, AND METHOD AND APPARATUS FOR PREDICTING DIRECT CURRENT COEFFICIENT

(75) Inventors: Dong Wang, Beijing (CN); Mingyuan Yang, Beijing (CN); Jin Song, Beijing (CN); Haoping Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1170 days.

(21) Appl. No.: 13/439,052

(22) Filed: Apr. 4, 2012

(65) Prior Publication Data

US 2012/0195380 A1  Aug. 2, 2012

Related U.S. Application Data

(63) Continuation of application No. PCT/CN2010/079137, filed on Nov. 25, 2010.

(30) Foreign Application Priority Data

Dec. 31, 2009  (CN) .......................... 2009 1 0216974

(51) Int. Cl.
- *H04N 7/12*  (2006.01)
- *H04N 7/26*  (2006.01)
- *H04B 1/66*  (2006.01)
- *G06K 9/36*  (2006.01)

(Continued)

(52) U.S. Cl.
CPC ............. *H04N 19/105* (2014.11); *H04N 19/11* (2014.11); *H04N 19/159* (2014.11); *H04N 19/176* (2014.11); *H04N 19/18* (2014.11); *H04N 19/46* (2014.11); *H04N 19/593* (2014.11)

(58) Field of Classification Search
CPC .............. H04N 7/26; H04N 7/12; G06K 9/36
See application file for complete search history.

(56) References Cited

U.S. PATENT DOCUMENTS

| 6,842,484 B2 | 1/2005 | Gandhi et al. |
| 2004/0071356 A1 | 4/2004 | Sudharsanan et al. |

(Continued)

FOREIGN PATENT DOCUMENTS

| CN | 1941914 A | 4/2007 |
| CN | 101361370 A | 2/2009 |

(Continued)

OTHER PUBLICATIONS

Supplementary European Search Report dated Apr. 23, 2012 in connection with European Patent Application No. EP 10 84 0460.

(Continued)

*Primary Examiner* — Sath V Perungavoor
*Assistant Examiner* — Patricia I Young (57) ABSTRACT

Embodiments of the present invention provide a method and an apparatus for decoding and encoding a video, and a method and an apparatus for predicting a direct current coefficient. The video decoding method includes: receiving current frame image information sent by an encoding end, where the current frame image information includes prediction value information, and the prediction value information includes at least one intra-frame direct current DC prediction value; selecting a prediction value from the at least one intra-frame DC prediction value in the prediction value information as an intra-frame DC prediction value of the current image. Through the embodiments of the present invention, flexibility of encoding and decoding a video can be improved.

16 Claims, 5 Drawing Sheets

(51) Int. Cl.
*H04N 19/105* (2014.01)
*H04N 19/159* (2014.01)
*H04N 19/176* (2014.01)
*H04N 19/46* (2014.01)
*H04N 19/593* (2014.01)
*H04N 19/11* (2014.01)
*H04N 19/18* (2014.01)

(56) References Cited

U.S. PATENT DOCUMENTS

2005/0265447 A1* 12/2005 Park ............... H04N 19/105 375/240.03
2007/0076964 A1 4/2007 Song
2008/0310504 A1 12/2008 Ye et al.

FOREIGN PATENT DOCUMENTS

| | | | |
|---|---|---|---|
| CN | 101605255 A | 12/2009 | |
| EP | 1 950 971 A2 | 7/2008 | |

OTHER PUBLICATIONS

"Improving Intra DC prediction", Huawei Technologies, International Telecommunication Union, Apr. 2008, 6 pages.

Zhang Nan, et al., "Spatial Prediction Based Intra-Coding", 2004 IEEE International Conference on Multimedia and Expo (ICME), 2004, p. 97-100.

Peng Zhang, et al., "Multiple Modes Intra-Prediction in Intra Coding", 2001 IEEE International Conference on Multimeida and Expo (ICME), 2004, p. 419-422.

Shengsheng Yu, et al., "Distance-based Weighted Prediction for H.264 Intra Coding", 2008, p. 1477-1480.

Young-Joon Song, et al., "A Modification of DC and AC Prediction of Intra VOP", Oct. 1997, 5 pages.

Thomas Wiegand, et al., "Overview of the H.264/AVC Video Coding Standard", IEEE Transactions on Circuits and Systems for Video Technology, vol. 13, No. 7, Jul. 2003, p. 560-576.

Thomas Wiegand, et al., "Joint Draft ITU-T Rec. H.264 I ISO/IEC 14496-10/Amd.3 Scalable video coding", Joint Video Team (JVT) of ISO/IEC MPEG & ITU-T VCEG, 2th Meeting, Geneva, Switzerland, Jun. 29-Jul. 5, 2007, 559 pages.

Written Opinion of the International Searching Authority dated Mar. 10, 2011 in connection with International Patent Application No. PCT/CN2010/079137.

International Search Report dated Mar. 10, 2011 in connection with International Patent Application No. PCT/CN2010/079137.

Per Frojdh, et al., "Constrained Intra Prediction Coding", Sep. 18, 2001, 3 pages.

* cited by examiner

METHOD AND APPARATUS FOR DECODING AND ENCODING VIDEO, AND METHOD AND APPARATUS FOR PREDICTING DIRECT CURRENT COEFFICIENT

CROSS-REFERENCE TO RELATED APPLICATIONS

This application is a continuation of International Application No. PCT/CN2010/079137, filed on Nov. 25, 2010, which claims priority to Chinese Patent Application No. 200910216974.2, filed on Dec. 31, 2009, both of which are hereby incorporated by reference in their entireties.

TECHNICAL FIELD

The present invention relates to the field of video image processing, and in particular, to a method and an apparatus for intra-frame prediction and encoding, and a method and an apparatus for predicting a direct current coefficient.

BACKGROUND

H.264 encoding is a video encoding standard with highest performance currently, and is applied more and more widely. In this encoding scheme, encoding of each image uses a macro block (MB) as a basic encoding unit. A general size of the macro block is a 16×16 pixel unit currently. An important conception of encoding is predictive encoding. That is, encoded image information is used as a reference to predict data of an image that is encoded currently. At the time of encoding, only a difference between current data and predicted data needs to be transmitted. Each-frame image of a video may be encoded by using intra-frame (intra) encoding or inter-frame (inter) encoding. The intra encoding does not use an encoded image for prediction, but uses only information in a current image for prediction.

Intra-frame encoding of a macro block includes block encoding modes, such as 16×16, 8×8, and 4×4. Each kind of mode includes several kinds of prediction modes.

Many prediction modes exist in the H.264. Taking 4×4 as an example, 9 prediction modes are available for selection. Among the 9 prediction modes, except DC prediction (mean prediction), other 8 prediction modes are directional prediction, namely, predicting a current block in a certain direction. For a DC prediction mode, if surrounding pixels are all unavailable or do not exist, a constant may be used as a prediction value by default. This constant is a mid-value in a dynamic range of an image pixel. For example, for an 8-bit pixel value, a mid-value is 128. In conclusion, in intra encoding, when surrounding pixels are unavailable, only intra DC prediction can be used, and a prediction value must be a mid-value of a pixel.

In a process of implementing the present invention, the inventor finds the prior art has at least the following defects: for a case that only a constant (such as a mid-value of a pixel) can be used for intra-frame prediction in the aforementioned intra DC prediction mode among the DC prediction modes in the prior art, flexibility of intra-frame predictive encoding and decoding is poor; and when a specific image is encoded, a mid-value of a pixel probably deviates from a mid-value, thus causing deterioration of encoding quality.

SUMMARY

Embodiments of the present invention provide a method and an apparatus for decoding and encoding a video, and a method and an apparatus for predicting a direct current coefficient, so that flexibility of encoding and decoding can be improved.

An embodiment of the present invention provides a video decoding method, including:

receiving current frame image information sent by an encoding end, where the current frame image information includes prediction value information, and the prediction value information includes at least one intra-frame direct current DC prediction value; and selecting a prediction value from the at least one intra-frame DC prediction value in the prediction value information as an intra-frame DC prediction value of the current image.

In another aspect, an embodiment of the present invention further provide a video encoding method, including:

calculating at least one intra-frame DC prediction value for a current frame image; and sending current frame image information to a decoding end, where the current frame image information includes prediction value information, and the prediction value information includes the at least one intra-frame DC prediction value, so that the decoding end performs decoding.

In another aspect, an embodiment of the present invention further provides a video decoding apparatus, including:

a receiving unit, configured to receive current frame image information sent by an encoding end, where the current frame image information includes prediction value information, and the prediction value information includes at least one intra-frame DC prediction value; and a selecting unit, configured to select a prediction value from the at least one intra-frame DC prediction value in the prediction value information as an intra-frame DC prediction value of the current image.

In another aspect, an embodiment of the present invention further provides a video encoding apparatus, including:

a calculating unit, configured to calculate at least one intra-frame DC prediction value for a current frame image; and a sending unit, configured to send current frame image information to a decoding end, where the current frame image information includes prediction value information, and the prediction value information includes the at least one intra-frame DC prediction value, so that the decoding end performs decoding.

In another aspect, an embodiment of the present invention further provides a DC coefficient predicting method, including:

determining a block that is intra-frame encoded in a surrounding specific scope of a current block; and calculating a DC prediction value of the current block according to the block that is intra-frame encoded.

In another aspect, an embodiment of the present invention further provides a DC coefficient predicting apparatus, including:

a determining unit, configured to determine a block that is intra-frame coded in a surrounding specific scope of a current block;

a calculating unit, configured to calculate a DC prediction value of the current block according to the block that is intra-frame coded.

Through the embodiments of the present invention, an encoding end sends current frame image information to a decoding end, where the current frame image information includes prediction value information, and the prediction value information includes at least one intra-frame DC prediction value; and the decoding end receives the current frame image information sent by the encoding end, and uses the at least one intra-frame DC prediction value in the prediction value information as an intra-frame DC prediction value in the current image, so that flexibility of video encoding and decoding can be improved.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description are some embodiments, and persons of ordinary skill in the art may also derive other drawings from these accompany drawings without making any creative effort.

DETAILED DESCRIPTION

The technical solutions in the embodiments of the present invention are described clearly and completely in the following with reference to the accompanying drawings in the embodiments of the present invention. Apparently, the embodiments to be described are apart rather than all of the embodiments of the present invention. Base on the embodiments of the present invention, all other embodiments obtained by those skilled in the art without any creative effort shall fall within the protection scope of the present invention.

The embodiments of the present invention are described by taking an example that the size of a macro block is 16×16. A size of another macro block may be deduced in a similar way.

Figure 1:
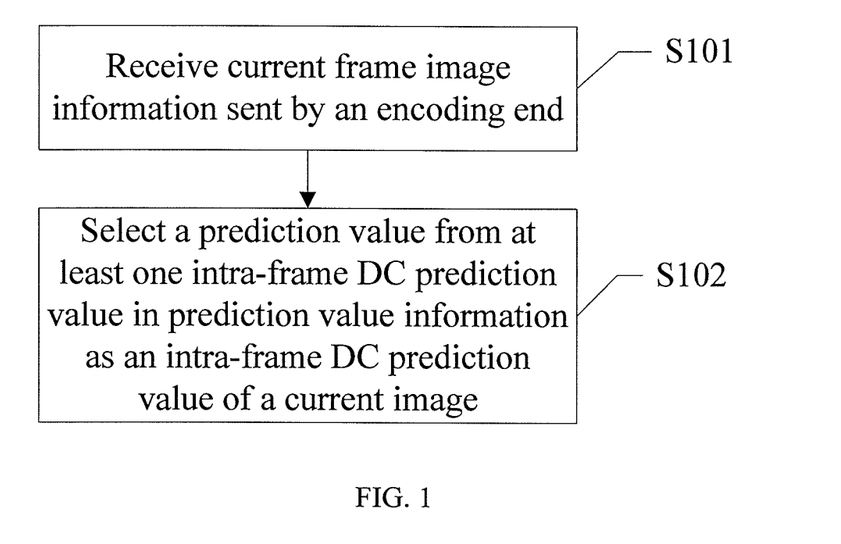
FIG. 1 is a schematic diagram of a video decoding method according to an embodiment of the present invention.

As shown in FIG. 1, a video decoding method provided in an embodiment of the present invention includes:

Step S101: Receive current frame image information sent by an encoding end, where the current frame image information includes prediction value information, and the prediction value information includes at least one intra-frame DC prediction value.

The current frame image information may be placed in header information of a current frame image of a video stream.

Step S102: Select a prediction value from the at least one intra-frame DC prediction value in the prediction value information as an intra-frame DC prediction value of the current image.

Preferably, the prediction value information in the preceding step S101 includes at least two DC prediction values. The current frame image information further includes selection information, and the selection information includes an identifier indicating a prediction value that needs to be selected from the at least two intra-frame DC prediction values. At this time, specific implementation of step S102 is: According to the selection information, select a prediction value from the at least two intra-frame DC prediction values in the prediction value information as an intra-frame DC prediction value of the current image.

A subject for executing the preceding action may be deployed on a decoding end.

Figure 2:
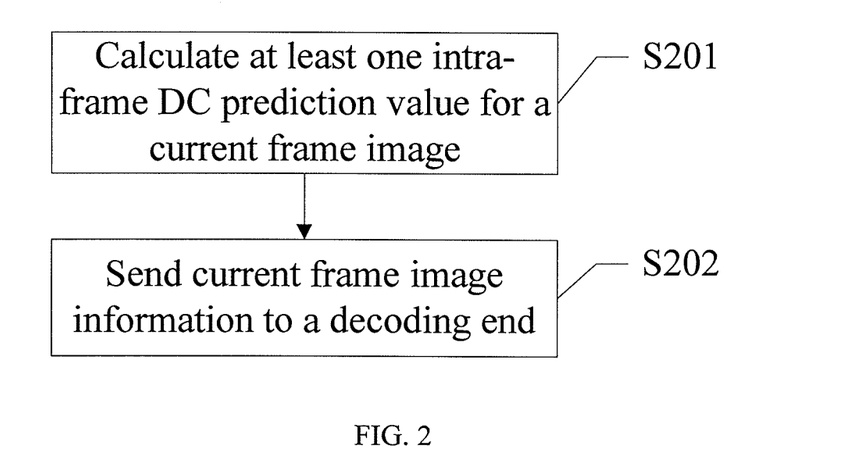
FIG. 2 is a schematic diagram of a video encoding method according to an embodiment of the present invention.

Furthermore, an embodiment of the present invention further provides a video encoding method. As shown in FIG. 2, the method includes:

Step S201: Calculate at least one intra-frame DC prediction value for a current frame image.

Step S202: Send current frame image information to a decoding end, where the current frame image information includes prediction value information, and the prediction value information includes the at least one intra-frame DC prediction value, so that the decoding end performs decoding.

The current frame image information may be placed in header information of a current frame image of a video stream.

Preferably, the calculating the at least one intra-frame DC prediction value for the current frame image in step S201 includes: calculating at least two intra-frame DC prediction values for the current frame image, where the current frame image information that is sent to the decoding end further includes selection information, and the selection information includes an identifier indicating a prediction value that needs to be selected by the decoding end from the at least two intra-frame DC prediction values.

A subject for executing the preceding action may be deployed on an encoding end. An order of the steps of the method in this embodiment of the present invention may be adjusted as actually required.

Through this embodiment of the present invention, an encoding end calculates a prediction value of each image by using at least two prediction modes; and a decoding end may select one of at least two prediction values calculated by the encoding end as an intra-frame DC prediction value, so that flexibility of encoding and decoding is improved, and quality of a video image is improved.

Embodiment 1

In this embodiment, when encoding each image, an encoding end may add new syntax into header information, or modify existing syntax, so as to transmit an intra-frame prediction value of a current frame. The proper intra-frame prediction value is calculated out by the encoding end according to each frame image, and reflects an adaptability feature of the prediction value. The encoding end may use multiple kinds of calculation methods to calculate a proper intra-frame prediction value according to the current frame, and the calculation method is not specially limited in this embodiment. For example, Table 1 shows average values of luminance components and chrominance components of various kinds of video sequences. For the current frame, the encoding end may use an average value of a luminance component and a chrominance component of a corresponding video sequence as the proper intra-frame prediction value.

TABLE 1

| Video sequence name | Average value | | |
|---|---|---|---|
| | Y | U | V |
| blue_sky_1920x1080p. | 126 | 144 | 111 |
| CrowdRun_1920x1080 | 97 | 123 | 129 |
| Kimono1_1920x1080 | 69 | 122 | 126 |
| ParkJoy_1920x1080p | 79 | 113 | 122 |
| ParkScene_1920x1080 | 73 | 120 | 128 |
| riverbed_1920x1080p | 93 | 119 | 127 |
| sunflower_1920x1080p | 78 | 102 | 141 |
| toys_and_calendar_1920x1080p | 68 | 122 | 135 |
| tractor_1920x1080p | 96 | 111 | 143 |

An implementation method that the encoding end may adopt to add the intra-frame prediction value into the header information is described by using two examples in the following.

(1) When a constrained intra prediction mode is considered, constrained_intrapred_flag in a current H.264 standard in picture parameter set is modified to a value that is not only capable of indicating whether to use the constrained intra prediction mode, but also may be used for calculating the intra-frame DC prediction value. For example, this value may be named as constrained_intra_pred, and a type of this value may be defined as se(v) or f(9), where se(v) represents a variable-length code with a symbol, and f(9) represents a 9-bit fixed-length code. Persons skilled in the art may understand that the name and the type of this value may be flexibly adjusted as actually required. When a value of constrained_intra_pred is 0, a decoding end does not use the constrained intra prediction mode; and otherwise, the decoding end uses the constrained intra prediction mode, and may use a constrained_intra_pred value to calculate the intra-frame DC prediction value, for example, constrained_intra_pred+1 may be used as the intra-frame DC prediction value.

(2) In the case of an H.264 SEI Message or a Slice Header, syntax may be added additionally, and a flag bit may be added. The flag bit is named as intra_dc_pred_present_flag. A value type of the flag bit may be defined as a 1-bit unsigned number, and is expressed as u(1) in the H.264 standard. The additionally added syntax includes information indicating how the decoding end calculates the intra-frame DC prediction value according to a value of the flag bit. For example, the added syntax may be expressed as:

intra_dc_pred_present_flag;
if (intra_dc_pred_present_flag);
intra_dc_pred_minus128.

The first row is used to instruct the decoding end to receive the intra_dc_pred_present_flag, and the second row is used to instruct the decoding end to judge whether the intra_dc_pred_present_flag is zero. If the intra_dc_pred_present_flag is zero, the decoding end uses a default mid-value (such as 128) as the intra-frame DC prediction value; if the intra_dc_pred_present_flag is not zero, the decoding end is instructed to receive intra_dc_pred_minus128, and use 128+intra_dc_pred_minus128 as the intra-frame DC prediction value. Here, the intra_dc_pred_minus128 is calculated out by the encoding end adaptively according to a specific image. The intra_dc_pred_minus128 may be a signed integer, for example, uses an 8-bit signed integer, and a value range is [−128, 127]; and may be expressed as i(8) in the H.264 standard. In the added syntax, the intra_dc_pred_minus128 is equivalent to a difference between an adaptive prediction value and 128. Definitely, the intra_dc_pred_minus128 in the added syntax may also be replaced by a practical adaptive prediction value, and the decoding end may use the adaptive prediction value as the intra-frame DC prediction value directly.

Embodiment 2

Figure 3:
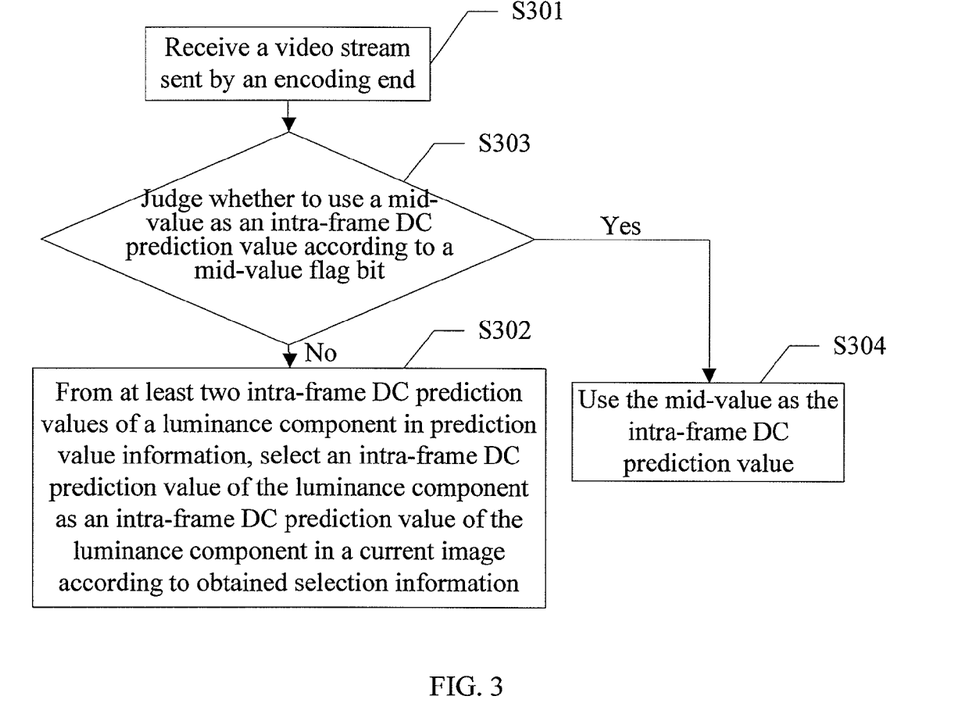
FIG. 3 is a schematic diagram of a video decoding method according to a first embodiment of the present invention.

This embodiment provides an intra-frame prediction method. As shown in FIG. 3, the method includes:

Step S301: Receive a video stream sent by an encoding end. Header information of a current frame image of the video stream includes current frame image information. The current frame image information includes prediction value information and selection information. The prediction value information includes at least one intra-frame DC prediction value. Preferably, the prediction value information includes at least two DC prediction values, and the encoding end uses at least two prediction modes to calculate at least two intra-frame DC prediction values of a luminance component. The selection information includes an identifier indicating that a prediction value of the luminance component needs to be selected from the at least two intra-frame DC prediction values.

Step S302: From the at least two intra-frame DC prediction values of the luminance component in the prediction value information, select an intra-frame DC prediction value of the luminance component as an intra-frame DC prediction value of the luminance component in the current image according to the obtained selection information.

In addition, the header information of the video stream may also include an added flag bit, which is referred to as mid-value flag bit in the following. The mid-value flag bit may be used to indicate whether a mid-value is used as an intra-frame DC prediction value. A decoding end may judge whether to perform step S302 according to the mid-value flag bit. Specifically, after execution of step S301, step S303 is performed: Judge whether to use the mid-value as the intra-frame DC prediction value according to the mid-value flag bit; if a judging result is that the mid-value is not used as the intra-frame DC prediction value, perform step S302; if a judging result is that the mid-value is used as the intra-frame DC prediction value, perform step S304: Use the mid-value as the intra-frame DC prediction value.

In this embodiment, it is considered that chrominance components of most video sequences are centralized near a mid-value (for example, near 128) of a dynamic range, in the method provided in this embodiment, the encoding end may add luminance component value prediction information into the header information of the video stream. For a chrominance component prediction mode, the mid-value of the dynamic range may be used as an intra-frame DC prediction value of the chrominance component.

Figure 4:
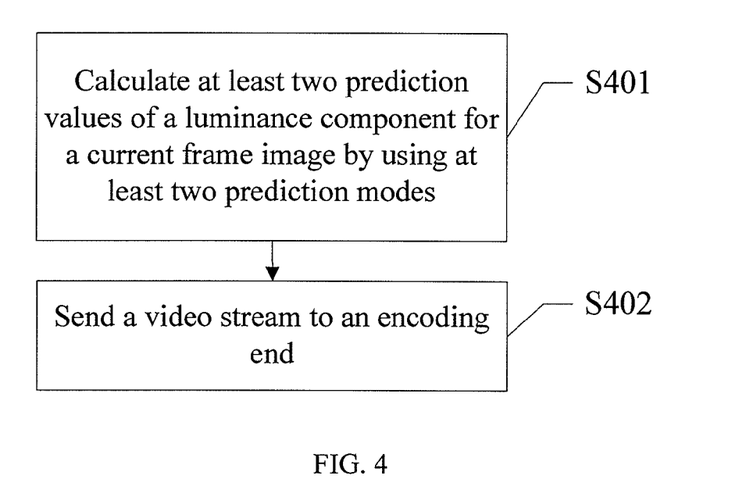
FIG. 4 is a schematic diagram of a video encoding method according to the first embodiment of the present invention.

Accordingly, an embodiment of the present invention further provides an intra-frame encoding method. As shown in FIG. 4, the method includes:

Step S401: Calculate at least two prediction values of a luminance component for a current frame image by using at least two prediction modes.

Step S402: Send a video stream to an encoding end. Header information of a current frame image of the video stream includes current frame image information, and the current frame image information includes prediction value information and selection information. The prediction value information includes at least two intra-frame DC prediction values of a luminance component for the current frame image, where the at least two intra-frame DC prediction values are calculated by using at least two prediction modes. The selection information includes an identifier indicating a prediction value of the luminance component, where the prediction value of the luminance component needs to be selected by a decoding end from the at least two prediction values.

In addition, the header information of the current frame image of the video stream that is sent to the decoding end may further include a mid-value flag bit. The mid-value flag bit is used to indicate whether the mid-value is used as an intra-frame DC prediction value.

It should be noted that in the video encoding method and the video decoding method in this embodiment, a current frame may be every frame in the video stream, and may also uses only some frames in the video stream, or may be only a specific frame in the video stream.

An order of the steps of the method in this embodiment may be adjusted as actually required. In this embodiment, an encoding end calculates at least two corresponding prediction values of a luminance component for each image by using at least two prediction modes; and a decoding end may select one prediction value of the luminance component from the at least two prediction values of the luminance component as an intra-frame DC prediction value of the luminance component, so that flexibility of encoding and decoding is improved, and quality of a video image is improved.

Embodiment 3

This embodiment provides a video decoding method. A difference between this method and the video decoding method provided in the first embodiment lies only in that: Receiving prediction value information of current frame image information of a video stream that is sent by an encoding end further includes: The encoding end calculates at least two intra-frame DC prediction values of a chrominance component for a current frame image by using at least two prediction methods. Accordingly, selection information further includes an identifier indicating a prediction value of the chrominance component, where the prediction value of the chrominance component needs to be selected by a decoding end from the at least two intra-frame DC prediction values of the chrominance component. The decoding end may obtain intra-frame DC prediction value information of the chrominance component through the prediction value information.

This embodiment further provides a video encoding method accordingly. A difference between this method and the video encoding method provided in the first embodiment lies only in that: An encoding end not only calculates an intra-frame DC prediction value of a luminance component, but also calculates at least two intra-frame DC prediction values of a chrominance component by using at least two prediction methods, adds the two intra-frame DC prediction values of the chrominance component into current frame image information, and adds an identifier into selection information, where the identifier is used to indicate a prediction value of the chrominance-component needs to be selected by a decoding end from the at least two prediction values of the chrominance component.

Because the intra-frame DC prediction values of the chrominance component are added into the prediction value information, compared with the first embodiment, with the method provided in this embodiment, flexibility of encoding and decoding is further improved.

Embodiment 4

This embodiment provides a video decoding method. It is considered that quantization is required at the time of encoding and that an image is not quite sensitive to precision of a prediction value transmitted in header information of an encoding end, this embodiment differs from the first embodiment and the second embodiment in: After quantizing a prediction value, the encoding end transmits the prediction value to a decoding end through the header information, in this way, encoding efficiency may further be improved. For example, when the prediction value in the first embodiment and the second embodiment is intra_dc_pred_minus128, the prediction value transmitted in this embodiment is intra_dc_pred_minus128/q, where q is a quantization step length. If q is 8, when the intra_dc_pred_minus128 adopts an 8-bit fixed-length code, a quantized prediction value needs only a 5-bit fixed length code.

It should be noted that in each embodiment of the present invention, an encoding end may, by using various manners such as arithmetic averaging and statistic averaging, calculate a prediction value that needs to be transmitted. Through this embodiment, flexibility of encoding and decoding may be improved, and quality of a video image may be improved.

Embodiment 5

This embodiment provides a video encoding and decoding method. It is assumed that DC prediction values in neighboring areas in an image are similar, it may consider adjusting a DC prediction value adaptively at the time of encoding each block. When predicting a current block, an encoding end or a decoding end determines blocks that are intra-frame encoded in an image area A in a surrounding specific scope, and calculates a DC prediction value of the current block according to these blocks that are intra-frame encoded. For example, an average value of pixel values of these blocks is calculated as the DC prediction value of the current block. Sizes of these encoded intra blocks may be not limited to one kind of block size. When this prediction mode is used, if no block that satisfies the foregoing condition exists around a current encoded block, a mid-value or a DC prediction value transmitted by the encoding end and described in the preceding embodiments may be used. An advantage of this prediction method lies in that: A DC prediction value obtained from a surrounding block is more accurate, so that the DC prediction value can better reflect a local characteristic of the current block, thus helping enhance encoding performance.

Figure 5:
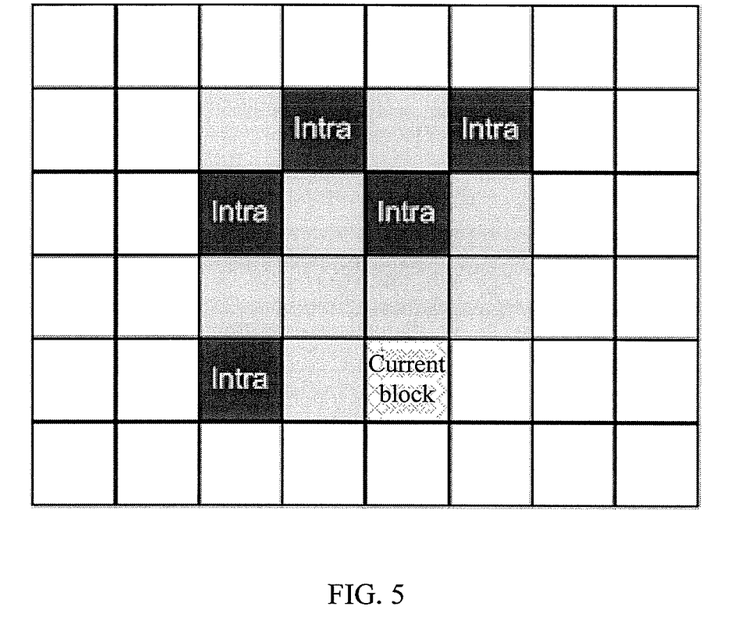
FIG. 5 is a schematic diagram of calculating a DC prediction value of an encoded block according to a fifth embodiment of the present invention.

This implementation method is described by using an example. FIG. 5 shows an image area. Each square represents an encoded unit block; a block marked as "current block" is a block that is to be encoded currently; another non-white area is the preceding-defined encoded image area A; and a block marked as "Intra" is an encoded Intra block in the area A, and other areas are non-Intra encoded blocks. When DC prediction is performed on the block that is to be encoded currently, an average value of all pixels of these encoded Intra blocks in the area A is calculated as a DC prediction value of the block that is to be encoded.

This method may be applied to the encoding end, and the DC prediction value obtained by calculation is sent to the decoding end. This method may also applied to the decoding end, and in this way, the encoding end may not need to send the DC prediction value to the decoding end, but the decoding end calculates a DC prediction value adaptively. Through this embodiment of the present invention, the encoding end or the decoding end may calculate the DC prediction value adaptively, so that flexibility of encoding and decoding is improved and quality of a video image is improved; and furthermore, because the DC prediction value does not need to be transmitted from the encoding end to the decoding end, a bandwidth is saved.

Embodiment 6

Figure 6:
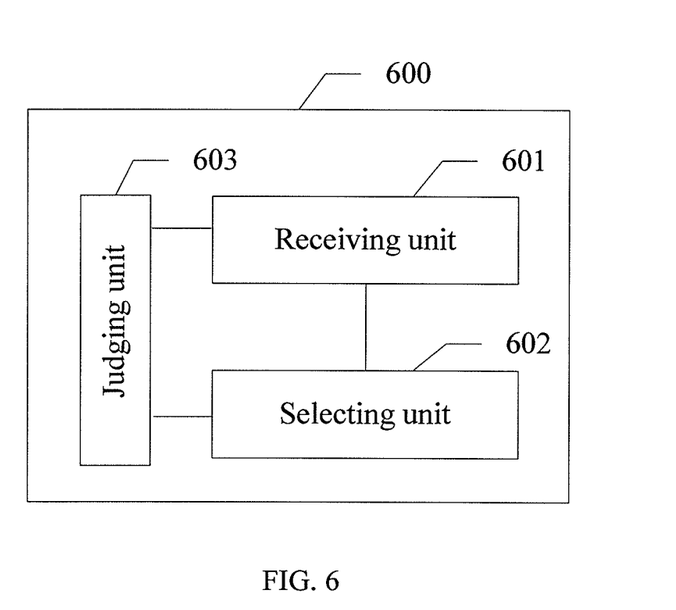
FIG. 6 is a schematic diagram of a video decoding apparatus according to a sixth embodiment of the present invention.

This embodiment provides a video decoding apparatus. As shown in FIG. 6, an apparatus 600 includes a receiving unit 601 and a selecting unit 602. The receiving unit 601 is configured to receive current frame image information that is sent by an encoding end, where the current frame image information includes prediction value information, and the prediction value information includes at least one intra-frame DC prediction value.

The selecting unit 602 is configured to select a prediction value from the at least one intra-frame DC prediction value in the prediction value information as an intra-frame DC prediction value of the current image.

Preferably, the prediction value information includes at least two DC prediction values; and the current frame image information further includes selection information, where the selection information includes an identifier indicating a prediction value that needs to be selected from the at least two intra-frame DC prediction values. The selecting unit 602 is specifically configured to select a prediction value from the at least two intra-frame DC prediction values in the prediction value information as an intra-frame DC prediction value of the current image according to the selection information.

The current frame image information may further include a mid-value flag bit. The mid-value flag bit is used to indicate whether a mid-value is used as an intra-frame DC prediction value. If the mid-value flag bit indicates that the mid-value is used as the intra-frame DC prediction value, at this time, the video decoding apparatus 600 in this embodiment may further include a judging unit 603. The judging unit 603 is configured to judge whether to use the mid-value as the intra-frame DC prediction value according to the mid-value flag bit; and if a judging result is that the mid-value is used as the intra-frame DC prediction value, trigger the selecting unit 602 to use the mid-value as the intra-frame DC prediction value; and if the judging result is that the mid-value is not used as the intra-frame DC prediction value, trigger the selecting unit 602 to select a prediction value from the at least two prediction values in the prediction value information as the intra-frame DC prediction value of the current image.

The video decoding apparatus may be integrated in a circuit or a chip, including a CPU, a DSP (digital signal processing, Digital Signal Processing), or a communication chip.

Through this embodiment of the present invention, flexibility of encoding and decoding may be improved, and quality of a video image may be improved.

Embodiment 7

This embodiment provides an electronic device. The electronic device includes an intra-frame prediction apparatus in the fourth embodiment. The electronic device in this embodiment may be a mobile phone, a video processing device, a computer, and a server. Through this embodiment of the present invention, flexibility of encoding and decoding may be improved, and quality of a video image may be improved.

Embodiment 8

Figure 7:
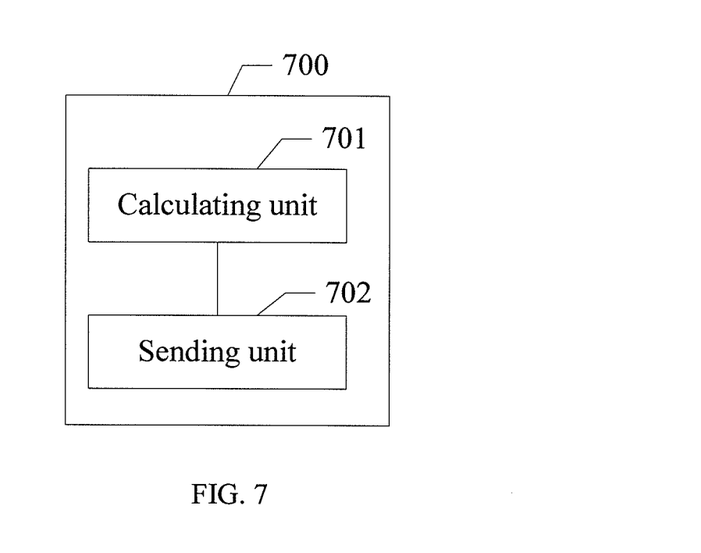
FIG. 7 is a schematic diagram of a video encoding apparatus according to an eighth embodiment of the present invention.

This embodiment provides a video encoding apparatus. As shown in FIG. 7, an intra-frame encoding apparatus 700 includes:

a calculating unit 701, configured to calculate at least one intra-frame DC prediction value for a current frame image; and a sending unit 702, configured to send current frame image information to a decoding end, where the current frame image information includes prediction value information, and the prediction value information includes the at least one intra-frame DC prediction value, so that the decoding end performed decoding.

Preferably, the calculating the at least one intra-frame DC prediction value for the current frame image includes: calculating at least two intra-frame DC prediction values for the current frame image, where the current frame image information that is sent to an decoding end further includes selection information, and the selection information includes an identifier indicating a prediction value that needs to be selected by the decoding end from the at least two intra-frame DC prediction values.

The video encoding apparatus may be integrated in a circuit or a chip, including a CPU, a DSP (digital signal processing, Digital Signal Processing), or a communication chip.

Through this embodiment of the present invention, flexibility of encoding and decoding may be improved, and quality of a video image may be improved.

Embodiment 9

This embodiment provides an electronic device. The electronic device includes an intra-frame encoding apparatus described in the sixth embodiment. The electronic device in this embodiment of the present invention may be a mobile phone, a video processing device, a computer, and a server. Through this embodiment of the present invention, flexibility of encoding and decoding may be improved, and quality of a video image may be improved.

Embodiment 10

Figure 8:
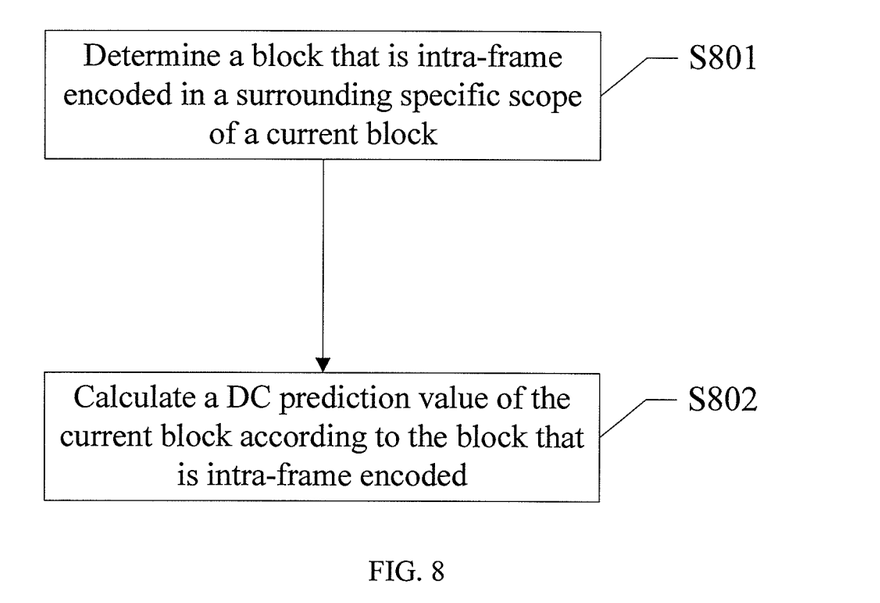
FIG. 8 is a schematic diagram of a DC coefficient predicting method according to a tenth embodiment of the present invention.

This embodiment provides a DC coefficient predicting method. As shown in FIG. 8, the method includes:

Step S801: Determine a block that is intra-frame encoded in a surrounding specific scope of a current block.

Step S802: Calculate a DC prediction value of the current block according to the block that is intra-frame encoded.

Specific implementation of step S802 may be: Calculate an average value of all pixels in the block that is intra-frame encoded, and use the average value as the DC prediction value of the current block.

This method may be applied to an encoding end, and a predicted DC prediction value is sent to a decoding end. This method may also be applied to the decoding end, and in this way, the encoding end may not need to send the DC prediction value to the decoding end, but the decoding end calculates a DC prediction value adaptively. Through this embodiment of the present invention, the encoding end or the decoding end may calculate the DC prediction value adaptively, so that flexibility of encoding and decoding may be improved, and quality of a video image may be improved; and furthermore, because the DC prediction value does not need to be transmitted from the encoding end to the decoding end, a bandwidth is saved.

Embodiment 11

Figure 9:
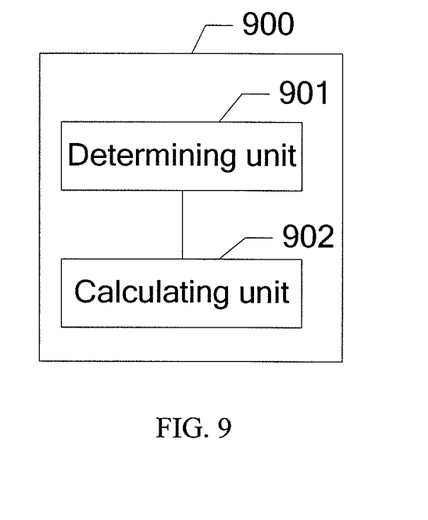
FIG. 9 is a schematic diagram of a DC coefficient predicting apparatus according to an eleventh embodiment of the present invention.

Corresponding to the tenth embodiment, this embodiment provides a DC coefficient predicting apparatus. As shown in FIG. 9, the apparatus includes:

a determining unit 901, configured to determine a block that is intra-frame encoded in a surrounding specific scope of a current block; and a calculating unit 902, configured to calculate a DC prediction value of the current block according to the block that is intra-frame encoded. Specifically, the calculating unit 902 is configured to calculate an average value of all pixels in the block that is intra-frame encoded, and use the average value as the DC prediction value of the current block.

This apparatus may be integrated in an encoding end, and sends a predicted DC prediction value to a decoding end. This apparatus may also be integrated in the decoding end, and in this way, the encoding end may not need to send the DC prediction value to the decoding end, but the decoding end calculates a DC prediction value adaptively. Through this embodiment of the present invention, the encoding end or the decoding end may calculate the DC prediction value adaptively, so that flexibility of encoding and decoding is improved, and quality of a video image is improved; and furthermore, because the DC prediction value does not need to be transmitted from the encoding end to the decoding end, a bandwidth is saved.

Those skilled in the art may understand that units and algorithm steps described in each embodiment disclosed in this specification can be implemented by electronic hardware, computer software, or a combination of the two. In order to describe interchangeability of hardware and software more clearly, the preceding description has generically described composition and steps of each exemplary embodiment according to functions. Whether these functions are implemented by hardware or software depends on specific application of the technical solutions and a constraint condition of the design. Those skilled in the art may use different methods to implement the described functions in each specific application, but such implementation shall not be regarded as a departure from the scope of the present invention.

The steps of the method or algorithm described in the embodiments disclosed in this specification may be implemented by hardware, a software module executed by a processor, or a combination of the two. The software module may be set in a Random Access Memory (RAM), a memory, a Read-Only Memory (ROM), an electrically programmable ROM, an electrically erasable programmable ROM, a register, a hard disk, a moveable disk, a CD-ROM, or any other form of storage medium well-known in the art.

The preceding descriptions are only exemplary embodiments of the present invention. It should be noted that, those skilled in the art may also make several improvements and modifications without departing from the principle of the present invention. These improvements and modifications shall also fall within the protection scope of the present invention.

What is claimed is:

1. A video decoding method, comprising:
receiving current frame image information sent by an encoding end,
wherein the current frame image information comprises prediction value information, and the prediction value information comprises at least one intra-frame direct current (DC) prediction value,
wherein the at least one intra-frame DC prediction value for a current block is determined from one or more intra-frame encoded blocks in a surrounding image area of the current block, at least one of the one or more intra-frame encoded blocks not being adjacent to the current block; and
selecting a prediction value from the at least one intra-frame DC prediction value in the prediction value information as an intra-frame DC prediction value of the current image.

2. The method according to claim 1, wherein:
the prediction value information comprises at least two DC prediction values; and the current frame image information further comprises selection information, and the selection information comprises an identifier indicating a prediction value that needs to be selected from the at least two intra-frame DC prediction values; and
the selecting a prediction value from the at least one intra-frame DC prediction value in the prediction value information as the intra-frame DC prediction value of the current image comprises:
selecting a prediction value from the at least two intra-frame DC prediction values in the prediction value information as an intra-frame DC prediction value of the current image according to the selection information.

3. The method according to claim 1, wherein:
the current frame image information further comprises a mid-value flag bit, and the mid-value flag bit is used to indicate whether a mid-value is used as an intra-frame DC prediction value; and
the method further comprises: after receiving a video stream sent by the encoding end, judging whether to use the mid-value as the intra-frame DC prediction value according to the mid-value flag bit; and if the mid-value is used as the intra-frame DC prediction value, using the mid-value as the intra-frame DC prediction value; and if the mid-value is not used as the intra-frame DC prediction value, selecting a prediction value from the at least one prediction value in the prediction value information as the intra-frame DC prediction value of the current image.

4. A video encoding method, comprising:
calculating at least one intra-frame DC prediction value for a current frame image, wherein the at least one intra-frame DC prediction value for a current block is determined from one or more intra-frame encoded blocks in a surrounding image area of the current block, at least one of the one or more intra-frame encoded blocks not being adjacent to the current block; and
sending current frame image information to a decoding end, wherein the current frame image information comprises prediction value information, and the prediction value information comprises the at least one intra-frame DC prediction value, so that the decoding end performs decoding.

5. The method according to claim 4, wherein:
the calculating the at least one intra-frame DC prediction value for the current frame image comprises: calculating at least two intra-frame DC prediction values for the current frame image, wherein the current frame image information that is sent to an decoding end further comprises selection information, and the selection information comprises an identifier indicating a prediction value that needs to be selected by the decoding end from the at least two intra-frame DC prediction values.

6. The method according to claim 4, wherein:
the current frame image information that is sent to the decoding end further comprises a mid-value flag bit, and the mid-value flag bit is used to indicate whether a mid-value is used as an intra-frame DC prediction value.

7. A video decoding apparatus, comprising:
a receiving unit, configured to receive current frame image information sent by an encoding end, wherein the current frame image information comprises prediction value information, and the prediction value information comprises at least one intra-frame direct current DC prediction value, wherein the at least one intra-frame DC prediction value for a current block is determined from one or more intra-frame encoded blocks in a surrounding image area of the current block, at least one of the one or more intra-frame encoded blocks not being adjacent to the current block; and a selecting unit, configured to select a prediction value from the at least one intra-frame DC prediction value in the prediction value information as an intra-frame DC prediction value of the current image.

8. The video decoding apparatus according to claim 7, wherein:
the prediction value information comprises at least two DC prediction values; and the current frame image information further comprises selection information, and the selection information comprises an identifier indicating a prediction value that needs to be selected from the at least two intra-frame DC prediction values; and
the selecting unit is configured to select a prediction value from the at least two intra-frame DC prediction values in the prediction value information as an intra-frame DC prediction value of the current image according to the selection information.

9. The video decoding apparatus according to claim 7, wherein:
the current frame image information further comprises a mid-value flag bit, and the mid-value flag bit is used to indicate whether a mid-value is used as an intra-frame DC prediction value;
the video decoding apparatus further comprises:
a judging unit, configured to judge whether to use the mid-value as the intra-frame DC prediction value according to the mid-value flag bit; and if a judging result is that the mid-value is used as the intra-frame DC prediction value, trigger the selecting unit to use the mid-value as the intra-frame DC prediction value; and if the judging result is that the mid-value is not used as the intra-frame DC prediction value, trigger the selecting unit to select a prediction value from the at least one prediction value in the prediction value information as the intra-frame DC prediction value of the current image.

10. A video encoding apparatus, comprising:
a calculating unit, configured to calculate at least one intra-frame DC prediction value for a current frame image, wherein the at least one intra-frame DC prediction value for a current block is determined from one or more intra-frame encoded blocks in a surrounding image area of the current block, at least one of the one or more intra-frame encoded blocks not being adjacent to the current block; and
a sending unit, configured to send current frame image information to a decoding end, wherein the current frame image information comprises prediction value information, and the prediction value information comprises the at least one intra-frame DC prediction value, so that the decoding end performs decoding.

11. The video encoding apparatus according to claim 10, wherein:
the calculating the at least one intra-frame DC prediction value for the current frame image comprises:
calculating at least two intra-frame DC prediction values for the current frame image, wherein the current frame image information that is sent to an decoding end further comprises selection information, and the selection information comprises an identifier indicating a prediction value that needs to be selected by the decoding end from the at least two intra-frame DC prediction values.

12. The video encoding apparatus according to claim 10, wherein:
the current frame image information sent by the sending unit further comprises a mid-value flag bit, and the mid-value flag bit is used to indicate whether a mid-value is used as an intra-frame DC prediction value.

13. A direct current DC coefficient predicting method, comprising:
determining a block that is intra-frame encoded in a surrounding specific scope of a current block; and
calculating a DC prediction value of the current block according to the block that is intra-frame encoded, wherein the block that is intra-frame encoded is not adjacent to the current block.

14. The DC coefficient predicting method according to claim 13, wherein:
the calculating the DC prediction value of the current block according to the block that is intra-frame encoded comprises:
calculating an average value of all pixels in the block that is intra-frame encoded, and using the average value as the DC prediction value of the current block.

15. A direct current DC coefficient predicting apparatus, comprising:
a determining unit, configured to determine a block that is intra-frame encoded in a surrounding specific scope of a current block; and
a calculating unit, configured to calculate a DC prediction value of the current block according to the block that is intra-frame encoded, wherein the block that is intra-frame encoded is not adjacent to the current block.

16. The DC coefficient predicting apparatus according to claim 15, wherein:
the calculating unit is configured to calculate an average value of all pixels in the block that is intra-frame encoded, and use the average value as the DC prediction value of the current block.

* * * * *